United States Patent
Liu et al.

(10) Patent No.: US 12,484,799 B2
(45) Date of Patent: Dec. 2, 2025

(54) MONITORING DEVICE HAVING NON-CONTACT PHYSIOLOGICAL PARAMETER MONITORING FUNCTION

(71) Applicant: SHENZHEN MINDRAY BIO-MEDICAL ELECTRONICS CO., LTD., Shenzhen (CN)

(72) Inventors: Qiling Liu, Shenzhen (CN); Junhua Xie, Shenzhen (CN); Jian Cen, Shenzhen (CN)

(73) Assignee: SHENZHEN MINDRAY BIO-MEDICAL ELECTRONICS CO., LTD., Shenzhen (CN)

( * ) Notice: Subject to any disclaimer, the term of this patent is extended or adjusted under 35 U.S.C. 154(b) by 429 days.

(21) Appl. No.: 18/070,394

(22) Filed: Nov. 28, 2022

(65) Prior Publication Data

US 2023/0097852 A1 Mar. 30, 2023

Related U.S. Application Data

(63) Continuation of application No. PCT/CN2020/093526, filed on May 29, 2020.

(51) Int. Cl.
*A61B 5/05* (2021.01)
*A61B 5/00* (2006.01)
(Continued)

(52) U.S. Cl.
CPC .......... *A61B 5/0507* (2013.01); *A61B 5/0002* (2013.01); *A61B 5/0205* (2013.01);
(Continued)

(58) Field of Classification Search
CPC ... A61B 5/0507; A61B 5/0002; A61B 5/0205; A61B 5/7225; A61B 5/742; A61B 5/022
See application file for complete search history.

(56) References Cited

U.S. PATENT DOCUMENTS 6,483,719 B1 * 11/2002 Bachman ............... H05K 9/00
361/752
9,833,200 B2 * 12/2017 Lin ..................... H04L 27/2273
(Continued)

FOREIGN PATENT DOCUMENTS

CN 102014737 A 4/2011
CN 102046076 A 5/2011
(Continued)

OTHER PUBLICATIONS

International Search Report issued in corresponding International Application No. PCT/CN2020/093526, mailed Feb. 20, 2021, 6 pages.
(Continued)

*Primary Examiner* — Rex R Holmes
(74) *Attorney, Agent, or Firm* — PV IP PC; Wei Te Chung

(57) ABSTRACT

A monitoring device having a non-contact physiological parameter monitoring function is disclosed. The monitoring device includes a radio frequency transmission assembly, a radio frequency receiving assembly, a first signal processing circuit and a processor. The radio frequency transmission assembly is configured to generate electromagnetic waves of a specific frequency and transmit the same towards a specific part of a human body. The radio frequency receiving assembly is configured to receive a reflected wave beam reflected back from the specific part of the human body. The first signal processing circuit is configured to convert the reflected wave beam into a first-type physiological parameter signal. The processor is configured to analyze the first-type physiological parameter signal to obtain a first-type physiological parameter value, and to output the first-type physiological parameter value. The psychological parameter values of a patient are acquired in a non-contact (Continued)

manner, thereby improving the convenience and safety of operation.

20 Claims, 10 Drawing Sheets

(51) Int. Cl.
    *A61B 5/0205*     (2006.01)
    *A61B 5/0507*     (2021.01)
    *A61B 5/022*     (2006.01)

(52) U.S. Cl.
    CPC ............ *A61B 5/7225* (2013.01); *A61B 5/742* (2013.01); *A61B 5/022* (2013.01)

(56) References Cited

U.S. PATENT DOCUMENTS

| | | | |
|---|---|---|---|
| 10,310,073 | B1 | 6/2019 | Santra et al. |
| 2006/0217612 | A1* | 9/2006 | Ouchi .................... G01S 13/88 600/407 |
| 2007/0252919 | A1 | 11/2007 | McGreevy |
| 2010/0061041 | A1 | 3/2010 | Chen |
| 2010/0130873 | A1 | 5/2010 | Yuen et al. |
| 2011/0054277 | A1* | 3/2011 | Pinter ................ A61B 5/02125 600/529 |
| 2019/0046038 | A1 | 2/2019 | Weinstein et al. |
| 2019/0054347 | A1 | 2/2019 | Saigh et al. |
| 2019/0336085 | A1 | 11/2019 | Kayser et al. |
| 2020/0129129 | A1 | 4/2020 | Sinharay et al. |

FOREIGN PATENT DOCUMENTS

| | | |
|---|---|---|
| CN | 102508256 A | 6/2012 |
| CN | 102512148 A | 6/2012 |
| CN | 202262983 U | 6/2012 |
| CN | 103263258 A | 8/2013 |
| CN | 108852307 A | 11/2018 |
| CN | 109171691 A | 1/2019 |
| CN | 110250774 A | 9/2019 |
| CN | 209661632 U | 11/2019 |
| CN | 110772233 A | 2/2020 |
| CN | 110772239 A | 2/2020 |
| CN | 111110239 A | 5/2020 |
| CN | 111157960 A | 5/2020 |
| CN | 111189559 A | 5/2020 |
| DE | 202018006171 U1 | 1/2020 |
| KR | 101787603 B1 | 10/2017 |
| WO | 2017099661 A1 | 6/2017 |
| WO | 2018033574 A1 | 2/2018 |
| WO | 2018212462 A1 | 11/2018 |
| WO | 2019113332 A1 | 6/2019 |
| WO | 2019198566 A1 | 10/2019 |

OTHER PUBLICATIONS

Extended European Search Report issued in related European Application No. 209384106, mailed Sep. 14, 2023, 17 pages.
Partial supplementary European Search Report issued in related European Application No. 209384106, mailed Jun. 22, 2023, 17 pages.
Sun Guanghao et al, "Vital-SCOPE: Design and Evaluation of a Smart Vital Sign Monitor for simultaneous Measurement of Pulse Rate, Respiratory Rate, and Body Temperature for Patient Monitoring", Journal of Sensors, vol. 2018, Jan. 1, 2018, pp. 1-7, XP055834189, 7 pages.

* cited by examiner

MONITORING DEVICE HAVING NON-CONTACT PHYSIOLOGICAL PARAMETER MONITORING FUNCTION

CROSS-REFERENCE TO RELATED APPLICATIONS

This application is a bypass continuation application of Patent Cooperation Treaty Application No. PCT/CN2020/093526, filed May 29, 2020, the content of which is incorporated herein by reference in its entirety.

TECHNICAL FIELD

The disclosure relates to the technical field of monitoring devices, and more particularly to a monitoring device having a non-contact physiological parameter monitoring function.

BACKGROUND

Physiological parameters are indicators and basis for determining health status of people. Therefore, medical staff in hospital can determine the severity and criticality of the disease according to the physiological parameters of patient. Physiological parameters mainly include body temperature, blood pressure, heart rate, respiration rate, Electrocardiogram the process of hospital diagnosis and treatment, medical staff needs to timely grasp the changes of the physiological parameters, so as to take effective diagnosis and treatment measures timely.

At present, the most common method of clinical physiological parameter measurement is to connect an electrode or sensor to the patient to acquire related signals. This contact measurement method is quite easy to impose certain stimulation on the human body, which may be inconvenient for some medical departments to use.

For example, patients with extensive burns in the burns department cannot be connected with the electrode or sensor at all. For patients in an emergency rescue against time, the contact measurement method needs to connect accessories and sensors, which affects the rescue efficiency to a certain extent. For patients with emotional instability, there may be problems that patients do not cooperate, and it is difficult to implement the contact measurement. In addition, because the electrodes, electrode pieces and related sensors used for contact measurement, are consumable products, the cost is high. Moreover, if the disinfection of reusable accessories is not complete, there may be cross infection of patients.

SUMMARY

In this regard, the present disclosure provides a monitoring device having non-contact physiological parameter monitoring function, which is capable of acquiring physiological parameters of patients in a non-contact way.

Embodiments of this disclosure provide a monitoring device having a non-contact physiological parameter monitoring function, which includes a radio frequency transmitting assembly, a radio frequency receiving assembly, a first signal processing circuit and a processor. The radio frequency transmitting assembly is configured to generate an electromagnetic wave of a designated frequency and transmit the electromagnetic wave of the designated frequency towards a designated part of a human body. The radio frequency receiving assembly is configured to receive a reflected wave beam which is reflected back from the designated part of the human body. The first signal processing circuit is configured to convert the reflected wave beam into a first-type physiological parameter signal. The processor is configured to analyze the first-type physiological parameter signal to obtain a first-type physiological parameter value and to control to output the first-type physiological parameter value.

Embodiments of this disclosure provide a triage table monitoring system, which includes a triage table with at least one triage position and at least one non-contact physiological parameter monitoring apparatus. The triage position of the triage table is configured to implement a preliminary examination before triage for a patient in position. Each non-contact physiological parameter monitoring apparatus includes a radio frequency transmitting assembly, a radio frequency receiving assembly, a signal processing circuit and a processor. The radio frequency transmitting assembly is configured to generate an electromagnetic wave of a designated frequency and transmit the electromagnetic wave of the designated frequency towards a corresponding triage position. The radio frequency receiving assembly is configured to receive a reflected wave beam which is reflected back from a designated part of the patient at the triage position. The signal processing circuit is configured to convert the reflected wave beam into a physiological parameter signal. The processor is configured to analyze the physiological parameter signal to obtain a physiological parameter value and to control to output the physiological parameter value.

Embodiments of this disclosure provide a non-contact physiological parameter monitoring device which includes a support seat and a non-contact physiological parameter monitoring apparatus. The support seat is configured to be supported at a bearing surface, and the non-contact physiological parameter monitoring apparatus is fixed at the support seat. The non-contact physiological parameter monitoring apparatus includes a radio frequency transmitting assembly, a radio frequency receiving assembly, a signal processing circuit and a processor. The radio frequency transmitting assembly is configured to generate an electromagnetic wave of a designated frequency and transmit the electromagnetic wave of the designated frequency towards a corresponding triage position. The radio frequency receiving assembly is configured to receive a reflected wave beam which is reflected back from a designated part of a patient at the triage position. The signal processing circuit is configured to convert the reflected wave beam into a physiological parameter signal. The processor is configured to analyze the physiological parameter signal to obtain a physiological parameter value and to control to output the physiological parameter value. Wherein, the support seat includes a seat and a movable bearing member which is arranged at the seat and is movable relative to the seat, and the non-contact physiological parameter monitoring apparatus is arranged at the movable bearing member of the support seat.

Embodiments of this disclosure provide a triage table monitoring system, which includes:
a triage table with at least one triage position, wherein the triage position is configured to implement a preliminary examination before triage for a patient in position; and
a non-contact physiological parameter monitoring apparatus, which includes:
at least a group of radio frequency signal receiving and transmitting assemblies, each group of radio frequency signal receiving and transmitting assemblies are correspondingly associated with one triage position of the triage table and are configured to transmit an electromagnetic wave of a designated frequency to the patient at the triage position and to receive a reflected wave beam which is reflected back from a designated body part of the patient at the triage position;

a signal processing circuit, which is configured to convert the reflected wave beam which is received by each group of radio frequency signal receiving and transmitting assemblies into a corresponding physiological parameter signal; and a processor, which is configured to analyze each physiological parameter signal to obtain a group of physiological parameter values, to determine patient identity information which corresponds to each group of physiological parameter values according to a preset association relationship between the radio frequency signal receiving and transmitting assemblies and the triage position of the triage table, and to bind and output each group of physiological parameter values and corresponding patient identity information thereof.

The monitoring device in this disclosure transmits an electromagnetic wave through the radio frequency transmitting assembly, receives the reflected wave beam from a designated body part of the patient through the radio frequency receiving assembly, obtains a physiological parameter signal of the patient according to the reflected wave beam, and then obtains the corresponding physiological parameter value, so that the physiological parameter value of the patient can be obtained in a non-contact manner, which improves the operation convenience and safety.

In this disclosure, a non-contact physiological parameter monitoring apparatus is arranged at a triage position of a triage table. The non-contact physiological parameter monitoring apparatus generates an electromagnetic wave of a designated frequency and transmits the same to a corresponding triage position, receives the reflected wave beam from a designated body part of the patient at the triage position, and then converts the reflected wave beam into a physiological parameter signal, analyzes the physiological parameter signal to obtain a physiological parameter value, and controls to output the physiological parameter value. In such a way, the physiological parameter value of the patient at the triage position can be automatically obtained by a non-contact way, and multiple patients at multiple triage positions can be measured at the same time without requiring the medical staff to perform the contact operations, which improves the triage efficiency.

BRIEF DESCRIPTION OF THE DRAWINGS

In order to more clearly explain the embodiments of this disclosure, the following will briefly introduce the drawings which are needed to be used in the description of the embodiments or the prior art. It is obvious that the drawings in the following description are only some embodiments of this disclosure. For those skilled in the art, other drawings can be obtained from these accompanying drawings without paying any creative works.

DETAILED DESCRIPTIONS

In order to have a clear and complete understanding of the technical solution of this disclosure, the technical solutions in the specific embodiments of this disclosure are described in detail with reference to the accompanying drawings. Obviously, the described embodiments are only some of the embodiments of the disclosure, rather than all of them. Based on the embodiments of the disclosure, all other embodiments, which can be obtained by one skilled in the art without making creative work, belong to the protection scope of the disclosure.

The terms "first", "second", etc., in the description, claims and attached drawings of this disclosure are only configured to distinguish different objects, rather than describe a specific order. Moreover, the terms "include", "comprise" or any other variation thereof are intended to cover non-exclusive inclusion, so that a process, method, product or device, which includes a series of steps or units, is not limited to the listed steps or units, but optionally further includes steps or units that are not listed, or optionally further includes other steps or units that are inherent to these processes, methods, products or devices.

Figure 1:
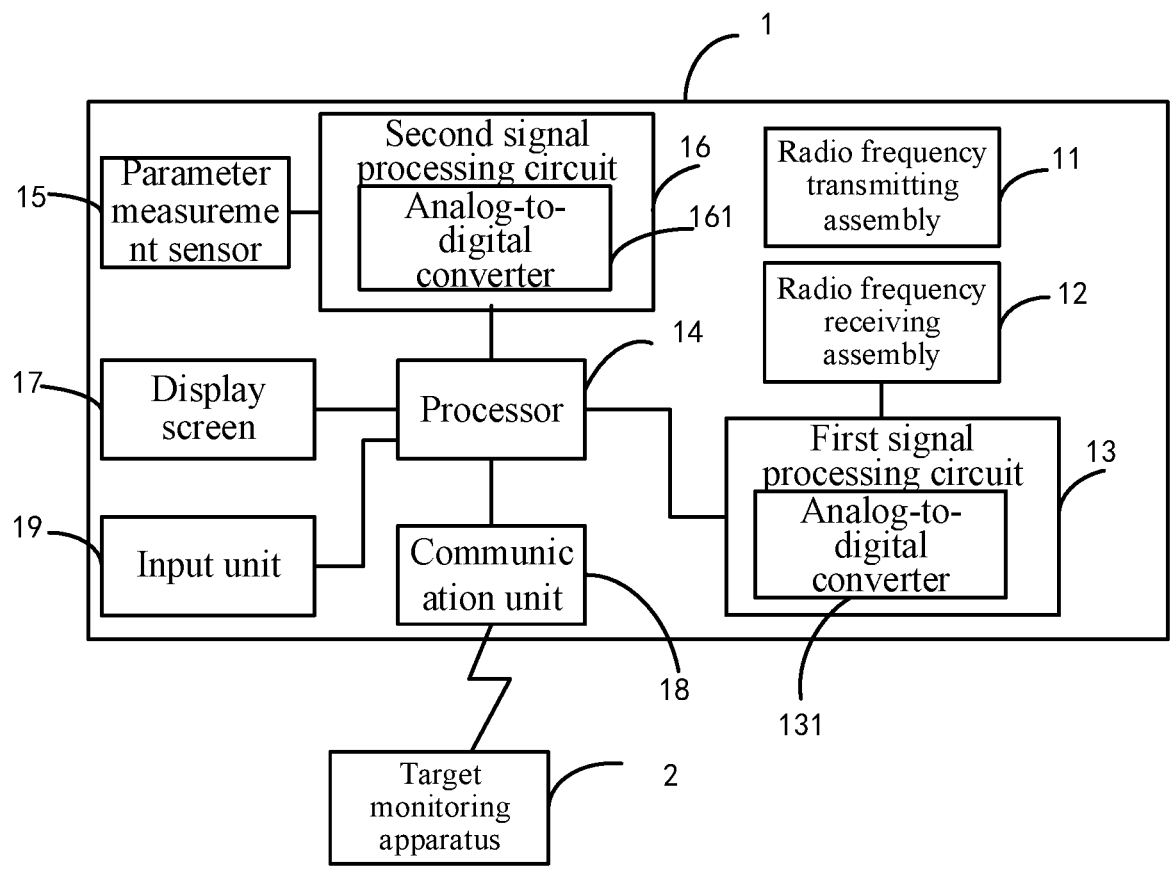
FIG. 1 is a structural diagram of a monitoring device having a non-contact physiological parameter monitoring function, according to one embodiment of this disclosure.

FIG. 1 is a structural diagram of a monitoring device 1 having a non-contact physiological parameter monitoring function (hereinafter referred to as monitoring device 1). The monitoring device 1 includes a radio frequency transmitting assembly 11, a radio frequency receiving assembly 12, a first signal processing circuit 13 and a processor 14. The radio frequency transmitting assembly 11 is configured to generate an electromagnetic wave of a designated frequency and transmit the electromagnetic wave of the designated frequency towards a designated part of a human body. The radio frequency receiving assembly 12 is configured to receive a reflected wave beam which is reflected back from the designated part of the human body. The first signal processing circuit 13 is configured to convert the reflected wave beam into a first-type physiological parameter signal. The processor 14 is connected with the first signal processing circuit 13, and is configured to analyze the first-type physiological parameter signal to obtain a first-type physiological parameter value, and to control to output the first-type physiological parameter value.

The monitoring device 1 in this disclosure transmits an electromagnetic wave through the radio frequency transmitting assembly 11, receives the reflected wave beam which is reflected from a designated body part of a patient through the radio frequency receiving assembly 12, obtains a physiological parameter signal of the patient according to the reflected wave beam, and then obtains the corresponding physiological parameter value, so that the physiological parameter value of the patient can be obtained in a non-contact manner, which improves the operation convenience and safety.

As shown in FIG. 1, the monitoring device 1 further includes at least one parameter measurement sensor 15 and a second signal processing circuit 16. The at least one parameter measurement sensor 15 includes a measurement terminal and a connection terminal. The at least one parameter measurement sensor 15 acquires a measurement signal by contacting the human body with the measurement terminal. The second signal processing circuit 16 is connected with the connection terminal of the at least one parameter measurement sensor 15 to receive the measurement signal which is acquired by the at least one parameter measurement sensor 15 and convert the measurement signal into a second-type physiological parameter signal. The processor 14 is also connected with the second signal processing circuit 16, and is configured to analyze the second-type physiological parameter signal to obtain a second-type physiological parameter value, and control to output the second-type physiological parameter value.

Thus, in this application, in addition to obtaining the first-type physiological parameter value through non-contact measurement, at least one parameter measurement sensor 15 is configured to contact the human body, and the second physiological parameter value is obtained through contact measurement. The monitoring device 1 obtains the physiological parameter value by combining the non-contact and contact measurement methods, which can greatly improve the types of available physiological parameter values.

Wherein, the non-contact measurement method of this disclosure refers to the aforementioned measurement method of transmitting electromagnetic wave through the radio frequency transmitting assembly 11, receiving the reflected wave beam reflected from the designated body part of the patient through the radio frequency receiving assembly 12, acquiring the physiological parameter signal of the patient according to the reflected wave beam, and then obtaining the corresponding physiological parameter value. The contact measurement method of this disclosure refers to a measurement method in which the measurement terminal of the at least one parameter measurement sensor 15 contacts the human body to acquire the measurement signal, and then obtains the corresponding physiological parameter value.

Wherein, the first-type physiological parameter value includes at least one of respiration rate and heart rate, and the second-type physiological parameter value includes at least one of body temperature, blood oxygen (SPO2) and blood pressure.

Wherein, the reflected wave beam which is reflected from the designated body part of the patient and then received by the radio frequency receiving assembly 12, reflects a fluctuation law of chest of the patient, and the fluctuation law of the chest of the patient further reflects the heartbeat information and/or respiratory information of the patient, that is, the heart rate and/or respiration rate. The first signal processing circuit 13 is configured to convert the reflected wave beam into the first-type physiological parameter signal, and the processor 34 is configured to analyze the first-type physiological parameter signal to obtain the heart rate and/or respiration, that is, to obtain at least one of the respiration rate and heart rate.

The at least one parameter measurement sensor 15 is configured to be arranged at the corresponding part of the patient, and is connected with the second signal processing circuit 16. The second signal processing circuit 16 receives the measurement signal which is acquired by the at least one parameter measurement sensor 15, and converts the measurement signal into the second-type physiological parameter signal.

In this disclosure, the at least one parameter measurement sensor 15 includes at least one of a temperature sensor, a blood oxygen sensor and a blood pressure sensor. In some embodiments, the at least one parameter measurement sensor 15 can simultaneously include a temperature sensor, a blood oxygen sensor, and a blood pressure sensor, for simultaneously acquiring measurement signals which are related to body temperature parameters, blood oxygen parameters, and blood pressure parameters.

Wherein, the blood oxygen sensor can include a blood oxygen probe, which can be a clamping structure and configured to clamp a finger of the patient to measure measurement signal which is related to the blood oxygen parameter through a light intensity signal, such as the blood oxygen concentration measurement signal. The blood oxygen sensor is connected with the second signal processing circuit 16 for transmitting the monitored measurement signal related to the blood oxygen parameter to the second signal processing circuit 16.

The blood pressure sensor can be arranged in a strap-type structure, and is bound to an arm of the patient through the strap-type structure. The blood pressure sensor is connected with the second signal processing circuit 16 for transmitting the monitored measurement signal related to the blood pressure parameter to the second signal processing circuit 16.

The temperature sensor includes a temperature probe, which can be attached to the corresponding body part of the patient in the form of an electrode sheet to realize the acquisition of temperature parameter signal. The temperature sensor is connected with the second signal processing circuit 16 for transmitting the monitored measurement signal related to the temperature parameter to the second signal processing circuit 16.

The second signal processing circuit 16 converts the measurement signals related to the body temperature parameter, blood oxygen parameter and blood pressure parameter into corresponding second-type physiological parameter signals, and the processor 14 analyzes the second-type physiological parameter signals to obtain the second-type physiological parameter values, and controls to output the second-type physiological parameter values.

Please refer back to FIGS. 1-2, which are the front view of monitoring device 1. The monitoring device 1 further includes a display screen 17, and the processor 14 is further configured to control the output and display of the first-type physiological parameter value and the second-type physiological parameter value on the display screen 17.

That is, in some embodiments, the first-type physiological parameter value and the second-type physiological parameter value can be directly displayed on the display screen 17 of the monitoring device 1 in a real-time for observation.

As shown in FIG. 1, the monitoring device 1 further includes a communication unit 18. The processor 14 establishes a communication connection between the monitoring device and a target monitoring apparatus 2 through the communication unit 18, and is configured to transmit the first-type physiological parameter value and the second-type physiological parameter value to the target monitoring apparatus 2 through the communication unit 18, and then outputs and displays the first-type physiological parameter value and the second-type physiological parameter value through the target monitoring apparatus 2.

Wherein, the target monitoring apparatus 2 includes at least one of bedside monitoring device, department-level workstation, hospital-level data center and hospital-level emergency management center.

Wherein, the communication unit 18 includes a wired communication unit and/or a wireless communication unit, and the communication connection between the monitoring device 1 and the target monitoring apparatus 2 includes a wired communication connection and/or a wireless communication connection.

Figure 2:
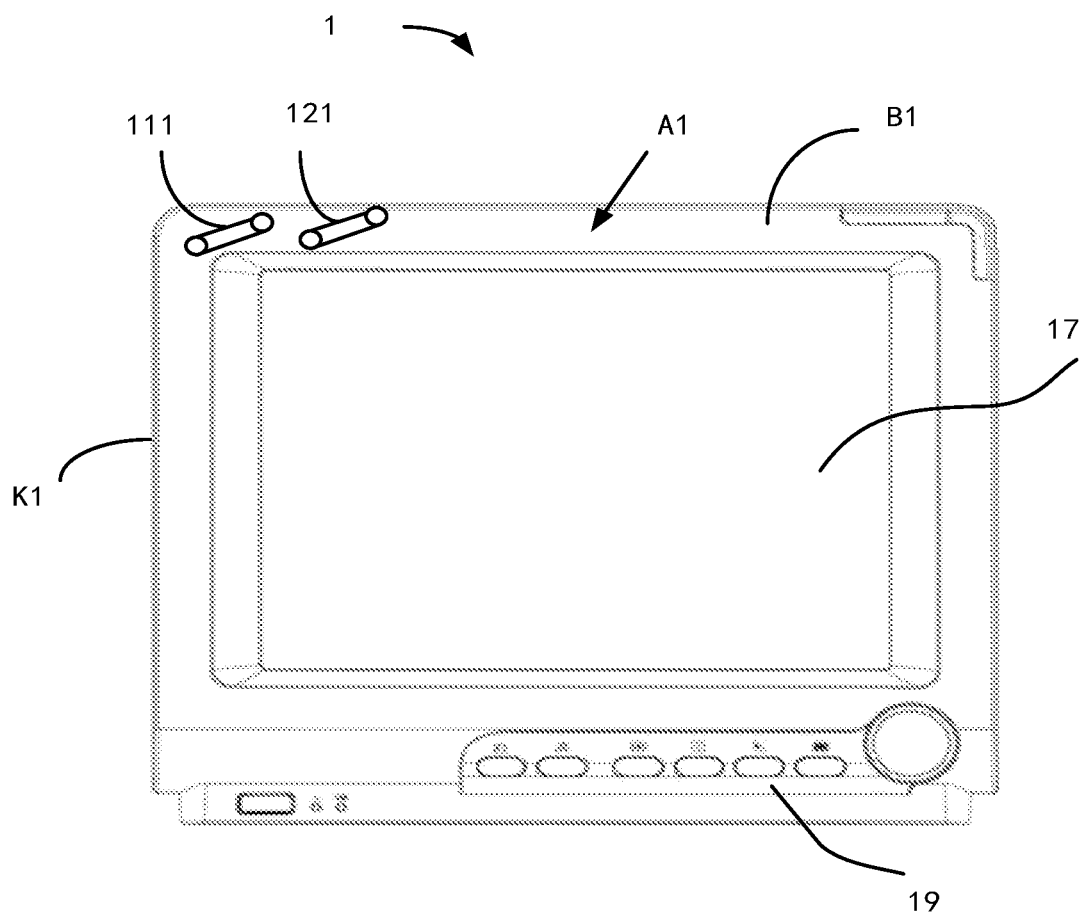
FIG. 2 is a front view of a monitoring device, according to one embodiment of this disclosure.

As shown in FIGS. 1 and 2, the monitoring device 1 further includes an input unit 19 for users, such as medical staff, to set the display and output or function of the monitoring device 1. The processor 14 is further configured to respond to the input operation of the input unit 19 for the display setting operation, and control to output the display screen 17 and display the first-type physiological parameter value and the second-type physiological parameter value, or only control to output and display one of the first-type physiological parameter value and the second-type physiological parameter value.

That is, in some embodiments, through the operation of the input unit 19, the display screen 17 can be controlled to display only the first-type physiological parameter value or the second-type physiological parameter value, or display both the first-type physiological parameter value and the second-type physiological parameter value.

In some embodiments, the at least one parameter measurement sensor 15 can further include an ECG sensor and a respiratory sensor.

Among them, there are multiple ECG sensors, which can be attached to the corresponding body part of the patient in the form of electrode sheets to acquire ECG parameter signals and obtain the corresponding ECG (electrocardiogram) data.

Among them, the respiratory sensor is configured to acquire the measurement signal related to respiratory parameter, such as the measurement signal related to respiration rate.

That is, in some embodiments, the at least one parameter measurement sensor 15 that directly contacts the corresponding part of the human body can further include an ECG sensor and a respiration sensor to acquire the heart rate and respiration rate of the patient through the contact measurement method.

Wherein, the processor 14 can also be configured to control the display screen 16 to display the heart rate and respiration rate of the patient which are obtained by the non-contact measurement and the heart rate and respiration rate of the patient which are obtained by the contact measurement for reference by medical staff.

Among them, the accuracy of the heart rate and respiration rate of the patient which is obtained by the contact measurement is often higher than that obtained by non-contact measurement. The processor 14 is further configured to correct the heart rate and respiration rate of the patient which are obtained by the non-contact measurement in response to the correction operation of the input unit 19, and obtain the heart rate correction value and respiration rate correction value. The heart rate correction value can be a difference value between the heart rate of the patient which is obtained by the non-contact measurement method and the heart rate of the patient which is obtained by the contact measurement method, and the respiration rate correction value can be the difference between the respiration rate of the patient which is obtained by the non-contact measurement method and the respiration rate of the patient which is obtained by the contact measurement method.

In some embodiments, in the process of acquiring the physiological parameter value of the patient by non-contact measurement method, the processor 14 analyzes the first-type physiological parameter signal to obtain the first-type physiological parameter value, and controls to output the first-type physiological parameter value, can include following procedures. The processor 14 analyzes the first-type physiological parameter signal to obtain the first-type physiological parameter value, obtains corrected first-type physiological parameter value through correcting the first-type physiological parameter value based on correction value which is obtained in advance, and controls to output the corrected first-type physiological parameter value.

That is, in some embodiments, the monitoring device 1 can also be equipped with an ECG sensor and a respiratory sensor at the same time, and the related measurement signals of the heart rate and respiration rate of the patient can be obtained through the contact measurement method. In response to the operation, the heart rate and respiration rate of the patient which are acquired by the contact measurement method can be compared with the heart rate and respiration rate which are acquired by the non-contact measurement method to obtain the correction values of the heart rate and respiration rate which are obtained by the non-contact measurement method, so as to improve the accuracy of the subsequent heart rate and respiration rate which are obtained by the non-contact measurement method.

Thus, after a preset time of correction, the accuracy of the heart rate and respiration rate which are obtained by the non-contact measurement method is improved to a certain extent. For example, after the heart rate and respiration rate which are obtained by the non-contact measurement method are basically the same as that obtained by the contact measurement method, the ECG sensor and respiratory sensor are no longer needed to contact the human body directly, which improves the convenience and greatly improves the measurement accuracy.

The input unit 19 can be an operation panel as shown in FIG. 2, including several mechanical keys. In some embodiments, the input unit 19 can also be a touch panel, which is integrated with the display screen 17 to constitute a touch display screen. In other embodiments, the input unit 19 may also be a voice input unit such as a microphone for receiving input operations in the voice form of a user.

Figure 3:
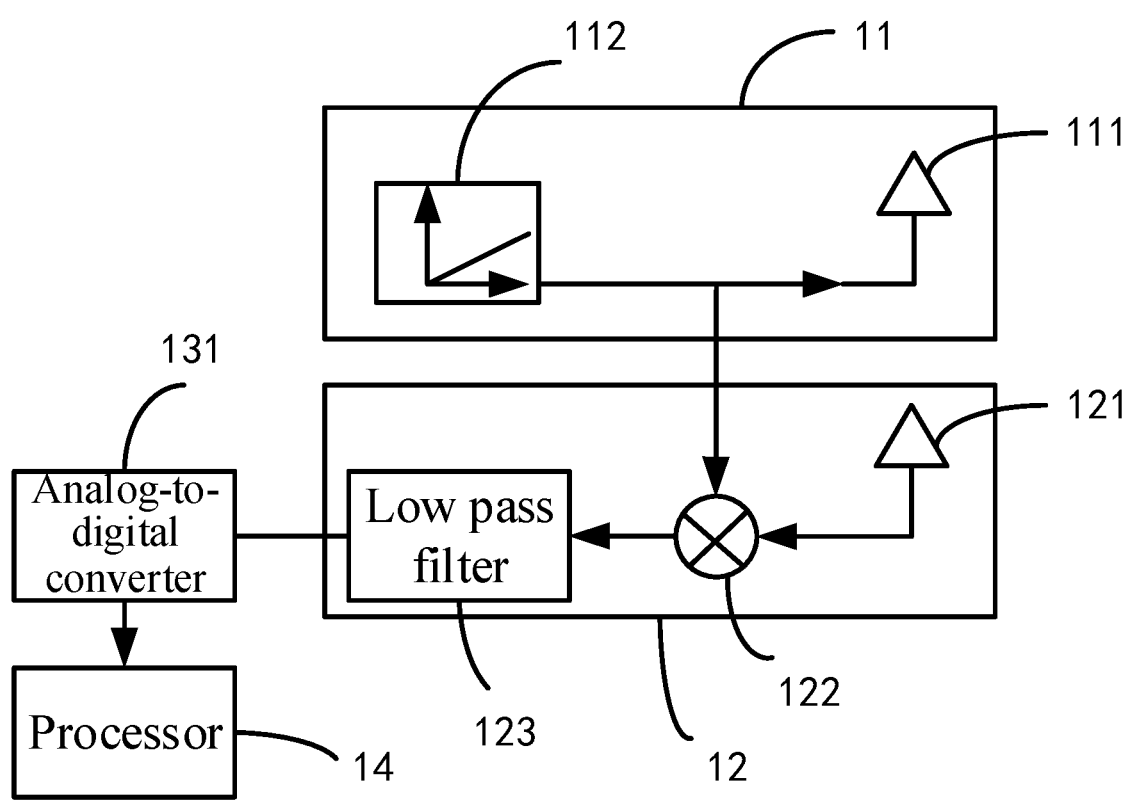
FIG. 3 is a specific structure diagram of a radio frequency transmitting assembly and radio frequency receiving assembly, according to one embodiment of this disclosure.

Refer to FIG. 3, which is a specific structure diagram of a radio frequency transmitting assembly 11 and radio frequency receiving assembly 12, according to one embodiment of this disclosure. As shown in FIG. 3, the radio frequency transmitting assembly 11 includes a transmitting antenna 111, the radio frequency receiving assembly 12 includes a receiving antenna 121. The transmitting antenna 111 is configured to transmit an electromagnetic wave of a designated frequency towards to a corresponding triage position and the receiving antenna 121 is configured to receive a reflected wave beam.

The transmitting antenna 111 and the receiving antenna 121 constitute a single-transmitting and single-receiving antenna or a multiple-transmitting and multiple-receiving antenna. That is, the transmitting antenna 111 and the receiving antenna 121 can cooperate with each other to constitute a transceiver antenna of single-transmitting and single-receiving or a transceiver antenna of multiple-transmitting and multiple-receiving.

Please refer back to FIG. 2. The transmitting antenna 111 and the receiving antenna 121 are arranged at a housing K1 of the monitoring device 1. The transmitting antenna 111 is configured to transmit an electromagnetic wave of a designated frequency towards an outside of the housing K1 of the monitoring device 11, and the receiving antenna 121 is configured to receive a reflected wave beam.

Wherein, the monitoring device 1 is a desktop monitoring device, for example, a bedside monitor, and the transmitting antenna 111 and receiving antenna 121 are arranged at a non-display area A1 of a front panel B1 of the desktop monitoring device.

Figure 4:
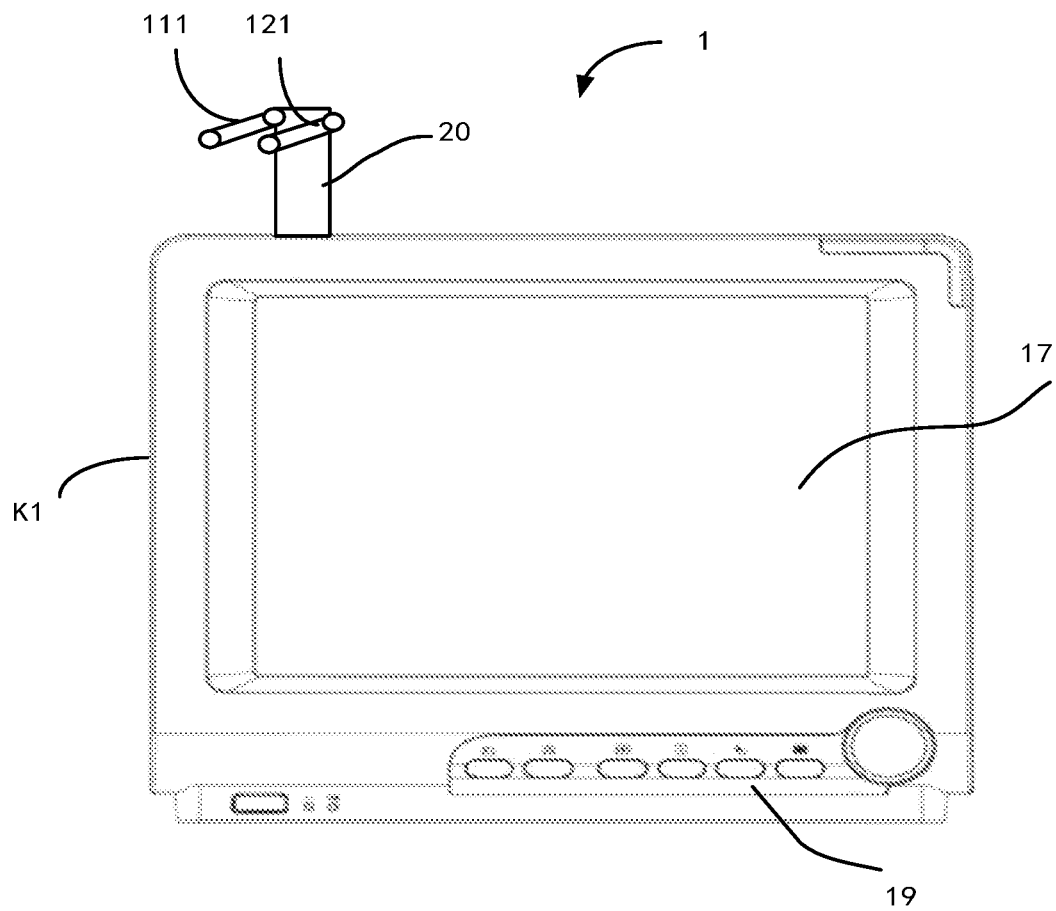
FIG. 4 is a front view of a monitoring device, according to another embodiment of this disclosure.

Refer to FIG. 4, which is a front view of the monitoring device 1 in another embodiment. Wherein, the monitoring device 1 is also a desktop monitoring device. The monitoring device 1 further includes a movable antenna support frame 20 which is arranged at a top of the monitoring device 1. The transmitting antenna 111 and the receiving antenna 121 are fixed at and supported by the antenna support frame 20. The antenna support frame 20 is configured to adjust a transmitting angle of the transmitting antenna 11 and a receiving angle of the receiving antenna 12.

Wherein, the antenna support frame 20 can rotate 360 degrees relative to the monitoring device 1, and is configured to control the transmitting antenna 111 and the receiving antenna 121 to face arbitrary direction(s), so as to adjust the transmitting angle of the transmitting antenna 111 and the receiving angle of the receiving antenna 121.

Figure 5:
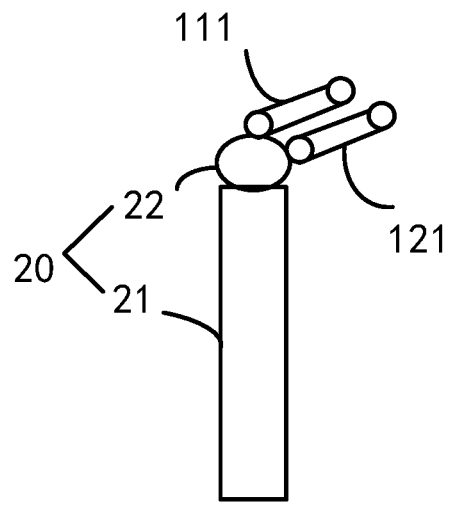
FIG. 5 is a specific structure diagram of an antenna frame, according to one embodiment of this disclosure.

Refer to FIG. 5, which is a structural diagram of the antenna support frame 20. The antenna support frame 20 can specifically include a support column 21 and a cardan shaft 22. The support column 21 is fixed at the top of the monitoring device 1. The cardan shaft 22 can be movably arranged at an end of the support column 21 which is away from the top of the monitoring device 1, and can rotate in arbitrary direction (a). The transmitting antenna 111 and the receiving antenna 121 are arranged at the cardan shaft 22, and can rotate with the cardan shaft 22 to achieve 360 degree rotation.

Wherein, the cardan shaft 22 can rotate in arbitrary direction(s) in response to the manual operation of the user. The support column 21 can be fixed at the top of the monitoring device 1 by means of screw locking and the likes.

In other embodiments, the antenna support frame 20 can also be made of materials such as memory metal rod that can be bent to any shape. One end of the antenna support frame 20 is fixed at the top of the monitoring device 1. The transmitting antenna 111 and the receiving antenna 121 can be fixed at the other end of the antenna support frame 20. The antenna support frame 20 can change its height and bend in arbitrary direction(s) in response to the manual operation of the user.

Wherein, the first signal processing circuit 13 and the processor 14 can be located inside the housing of the monitoring device 1, the support column 21 can be a hollow structure, and the top position of the monitoring device 1 at which the support column 21 is fixed, is provided with a through hole. The inner part of the support column 21 is connected with the through hole. The transmitting antenna 111 and the receiving antenna 121 can be electrically connected with an electrical connector which penetrates into and is arranged inside the support column 21. The electrical connector extends into the housing of the monitoring device 1 through the through hole, and is electrically connected with the first signal processing circuit 13 inside the housing of the monitoring device 1, so as to establish an electrical connection between the transmitting antenna 111, the receiving antenna 121 and the first signal processing circuit 13.

The electrical connector can be a wire, a flexible circuit board, etc.

In some embodiments, the monitoring device 1 is a handheld monitoring device. The handheld monitoring device includes a handheld end and a signal receiving and transmitting end which is away from the handheld end. The transmitting antenna 111 and the receiving antenna 121 are arranged at the signal receiving and transmitting end of the handheld monitoring device 1.

Wherein, the handheld end is the end for medical staff to hold, and the signal receiving and transmitting end can be the end facing the patient to be measured during use.

Please refer back to FIG. 3. The radio frequency transmitting assembly 11 further includes a synthesizer 112, which is coupled with the transmitting antenna 111 to generate an electromagnetic wave of a designated frequency and transmit the same through the transmitting antenna 111. The receiving antenna 121 is configured to receive the reflected wave beam. The radio frequency receiving assembly 12 further includes a frequency mixer 122, which is coupled between the receiving antenna 121 and the first signal processing circuit 13, and is configured to implement a frequency mixing processing on the reflected wave beam which is received by the receiving antenna 121 and transmit the same to the first signal processing circuit 13. The first signal processing circuit 13 is specifically configured to convert the reflected wave beam after the frequency mixing processing into a physiological parameter signal.

Among them, there can be at least one transmitting antenna 111 and at least one receiving antenna 121. The number of the transmitting antenna 111 and the receiving antenna 121 can be the same or different. Wherein, when there are one transmitting antenna 311 and one receiving antenna 321, the transmitting antenna 111 and the receiving antenna 121 can constitute a single-transmitting and single-receiving antenna, while when there are multiple transmitting antennas 111 and receiving antennas 121, the transmitting antenna 111 and the receiving antenna 121 can constitute a multiple-transmitting and multiple-receiving antenna.

Wherein, the radio frequency receiving assembly 12 further includes a low pass filter 123, which is coupled between the frequency mixer 122 and the first signal processing circuit 13 to filter the reflected wave beam after the frequency mixing processing. The first signal processing circuit 13 is specifically configured to convert the reflected wave beam after the frequency mixing processing and filtering into the physiological parameter signal.

That is, in some embodiments, the radio frequency receiving assembly 12 simultaneously includes a frequency mixer 122 and a low pass filter 123. The frequency mixer 122 and the low pass filter 123 are sequentially coupled between the receiving antenna 121 and the corresponding first signal processing circuit 13. The frequency mixer 122 is configured to implement a frequency mixing processing on the reflected wave beam received by the receiving antenna 121 and transmit it to the low pass filter 123. The low pass filter 123 is coupled between the frequency mixer 122 and the corresponding first signal processing circuit 13 to filter the reflected wave beam after the frequency mixing processing. The first signal processing circuit 13 is specifically configured to convert the reflected wave beam after the frequency mixing processing and filtering into a physiological parameter signal.

As shown in FIG. 2, the first signal processing circuit 13 includes an analog-to-digital converter 131, which is coupled with the radio frequency receiving assembly 12 to obtain the reflected wave beam received by the radio frequency receiving assembly 12 and convert the reflected wave beam received by the radio frequency receiving assembly 12 into the corresponding physiological parameter signal.

The second signal processing circuit 16 includes an analog-to-digital converter 161, which is coupled with at least one parameter measurement sensor 15 to obtain the measurement signal acquired by the at least one parameter measurement sensor 15 and convert the measurement signal into a second-type physiological parameter signal.

Wherein, the processor 14 can be a central processing unit (CPU), or other general-purpose processors, digital signal processor (DSP), application specific integrated circuits (ASIC), field-programmable gate arrays (FPGA) or other programmable logic device, discrete gate or transistor logic device, discrete hardware components, etc. A general-purpose processor may be a microprocessor or any conventional processor or the like.

The display screen 17 is an independent LCD display, LED (light emitting diode) display, electronic paper display, etc.

The communication unit 18 can include at least one of wired interface, WIFI module, Bluetooth module, WMTS communication module and NFC communication module.

Figure 6:
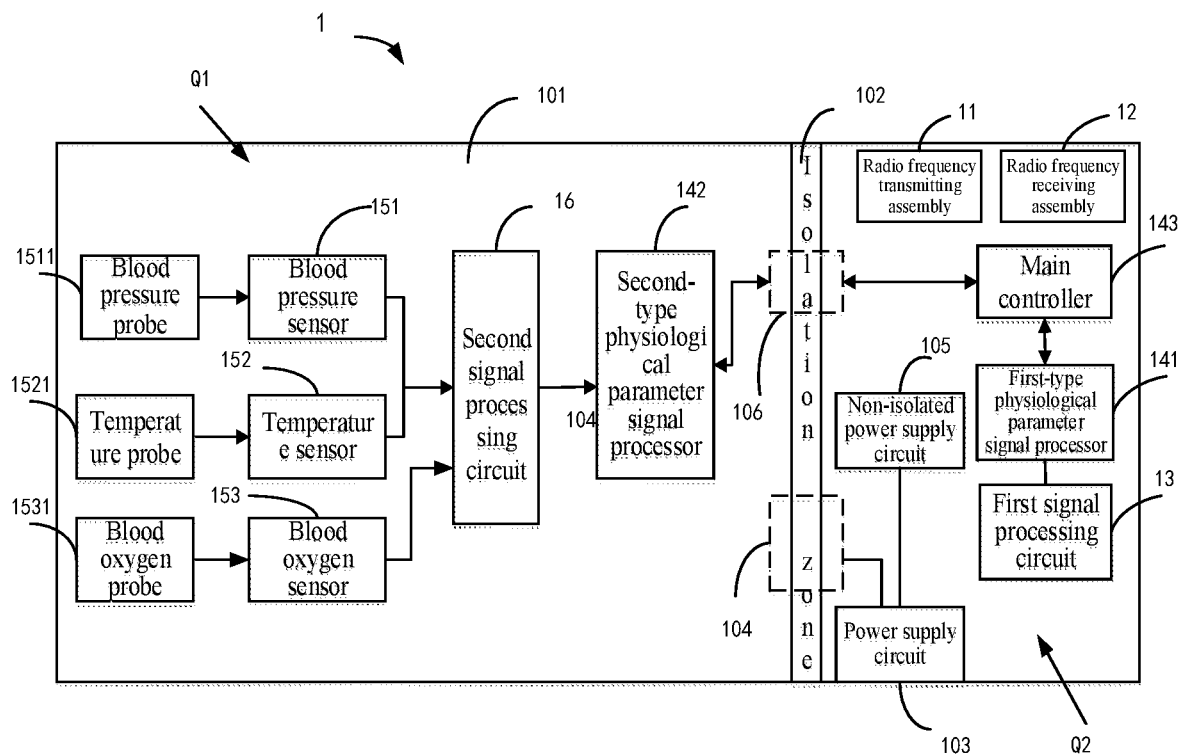
FIG. 6 is a schematic diagram of a specific circuit layout of a monitoring device, according to one embodiment of this disclosure.

Refer to FIG. 6, which is a schematic diagram of a specific circuit layout of a monitoring device 1. As shown in FIG. 6, the processor 14 includes a first-type physiological parameter signal processor 141, a second-type physiological parameter signal processor 142, and a main controller 143. The first-type physiological parameter signal processor 141 is configured to analyze the first-type physiological parameter signal to obtain the first-type physiological parameter value and transmit the same to the main controller 143, and the second-type physiological parameter signal processor 142 is configured to analyze the second-type physiological parameter signal to obtain the second-type physiological parameter value and transmit the same to the main controller 143. The main controller 143 is configured to control to output and display the first-type physiological parameter value and the second-type physiological parameter value.

That is, in some embodiments, the processor 14 specifically includes three processors/controllers, and each performs corresponding functions to improve performance.

As shown in FIG. 6, the monitoring device 1 further includes a circuit board 101, which is provided with an isolation zone 102, which isolates the circuit board 101 into an isolated area Q1 and a non-isolated area Q2. Wherein, the second-type physiological parameter signal processor 142, at least one parameter measurement sensor 15 and the second signal processing circuit 16 are arranged inside the isolated area Q1, while the first-type physiological parameter signal processor 141, the main controller 143, the radio frequency transmitting assembly 11, the radio frequency receiving assembly 12 and the first signal processing circuit 13 are arranged inside the non-isolated area Q2.

Wherein, the radio frequency transmitting assembly 11 and the radio frequency receiving assembly 12 are arranged inside the non-isolated area Q2, means that the structures of the radio frequency transmitting assembly 11 and the radio frequency receiving assembly 12, except the transmitting antenna 111 and the receiving antenna 121, are arranged inside the non-isolated area Q2.

As shown in FIG. 6, the monitoring device 1 further includes a power supply circuit 103 which is arranged inside the non-isolated area Q2 and an isolated power supply circuit 104 which is arranged inside the isolation zone 102. The power supply circuit 103 is configured to receive the main voltage, and the isolated power supply circuit 104 is configured to reduce the main voltage to provide electric power to the assemblies which are arranged inside the isolated area Q1 and include the second-type physiological parameter signal processor 142, at least one parameter measurement sensor 15 and second signal processing circuit 16.

Wherein, the power supply circuit 103 can include a main power interface for accessing the main voltage. The isolated power supply circuit 104 may include a first AC/DC (alternating current to direct current) converter, which is connected with the main power interface to convert the main voltage into a DC voltage and reduce the DC voltage, so as to generate a power supply voltage which is suitable for the second-type physiological parameter signal processor 142, at least one parameter measurement sensor 15 and second signal processing circuit 16.

As shown in FIG. 6, the monitoring device 1 further includes a non-isolated power supply circuit 105, which is connected with the power supply circuit 103, and is configured to reduce the main voltage to provide electric power to the assemblies which are arranged inside the non-isolated area Q2 and include the first-type physiological parameter signal processor 141, main controller 143, and first signal processing circuit 13. The non-isolated power supply circuit 105 can include a second AC/DC (alternating current to direct current) converter, which is connected with the main power interface to convert the main voltage into a DC voltage and reduce the DC voltage, so as to generate a power supply voltage which is suitable for the second-type physiological parameter signal processor 142, at least one parameter measurement sensor 15 and second signal processing circuit 16.

In some embodiments, the isolation zone 102 can be a shielding wall, and a height of the shielding wall can be higher than heights of the first-type physiological parameter signal processor 141, the main controller 143, the radio frequency transmitting assembly 11, the radio frequency receiving assembly 12, the first signal processing circuit 13, the second-type physiological parameter signal processor 142, the at least one parameter measurement sensor 15, the second signal processing circuit 16 and other assemblies at the circuit board 101, so as to realize the isolation of assemblies inside isolated area Q1 and non-isolated area Q2. The shielding wall can be a metal shielding wall.

In another embodiment, the isolation zone 102 can also be formed by an area of the circuit board 101 which is arranged with no circuit elements and lines. Wherein, a width of the isolation zone 102 is greater than a preset distance, so as to realize the isolation of assemblies inside isolated area Q1 and non-isolated area Q2.

As shown in FIG. 6, an isolation communication interface 106 is arranged inside the isolation zone 102. The second-type physiological parameter signal processor 142 establishes a communication connection with the main controller 143 through the isolation communication interface 106, and transmits the second-type physiological parameter value to the main controller 143.

Wherein, when the isolation zone 102 is a shielding wall, the isolation communication interface 106 can be an opening which is opened on and penetrates through the shielding wall, and the second-type physiological parameter signal processor 142 is electrically connected with the main controller 143 through an electrical connector which penetrates through the opening, thereby establishing a communication connection.

The isolation communication interface 106 can also be a double-end connector. The two ends of the isolation communication interface 106 can be electrically connected with the second-type physiological parameter signal processor 142 and the main controller 143 through electrical connectors respectively, so as to establish the communication connection between the second-type physiological parameter signal processor 142 and the main controller 143. The electrical connector can be a wire or a flexible circuit board, etc.

As shown in FIG. 6, as previously described, at least one parameter measurement sensor 15 can include a blood pressure sensor 151, a temperature sensor 152, and a blood oxygen sensor 153. The monitoring device 1 can also include a blood pressure probe 1511, a temperature probe 1521, and a blood oxygen probe 1531, which are configured to respectively contact the human body for the blood pressure sensor 151, the temperature sensor 152, and the blood oxygen sensor 153 to acquire the blood pressure, body temperature, and blood oxygen related measurement signals.

The blood pressure probe 1511, temperature probe 1521 and blood oxygen probe 1531 can extend from the monitoring device 1 through a wire and contact with a designated body part of the patient.

In some embodiments, the monitoring device 1 can be a sphygmomanometer, and the transmitting antenna 111 and receiving antenna 121 are arranged inside the non-display area of a scale panel of the sphygmomanometer.

Thus, when the patient uses the sphygmomanometer for blood pressure measurement, at least one parameter of heart rate and respiration rate of the patient can be automatically acquired through non-contact measurement method.

In other embodiments, the monitoring device 1 of the application can also be applied to a triage table.

Figure 7:
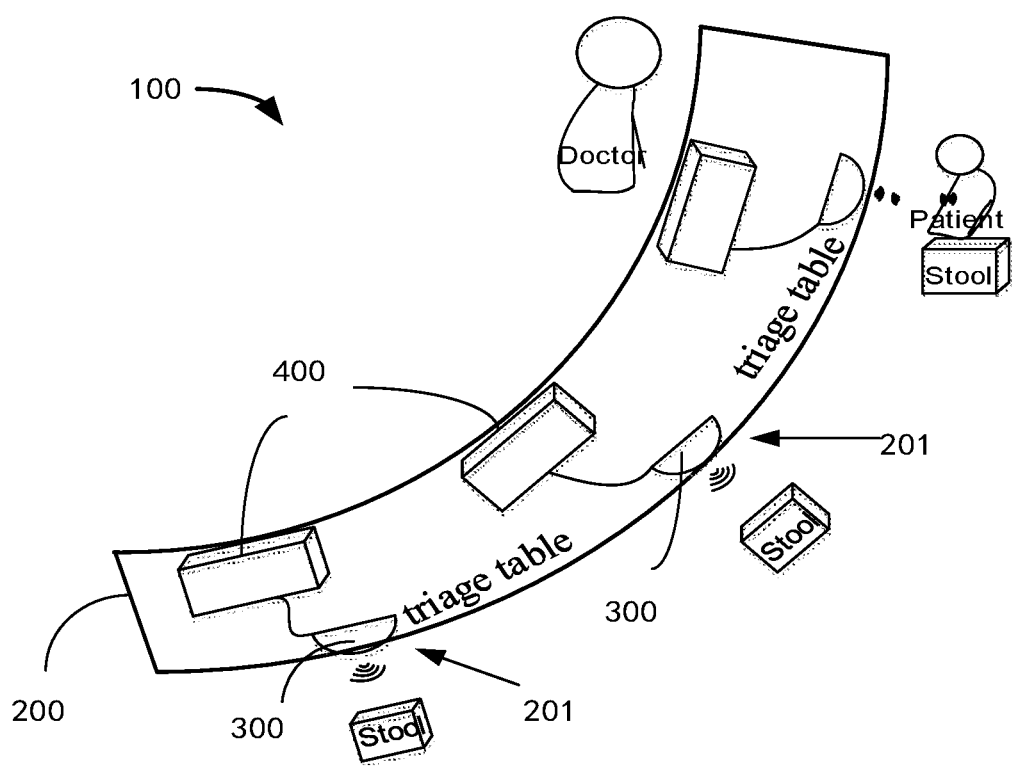
FIG. 7 is a schematic diagram of a triage table monitoring system, according to one embodiment of this disclosure.

Refer to FIG. 7, which is a schematic diagram of a triage table monitoring system 100. The triage table monitoring system 100 includes a triage table 200 with at least one triage position 201 and at least one non-contact physiological parameter monitoring apparatus 300. Wherein, the triage position 201 of the triage table 200 is configured to implement a preliminary examination before triage for a patient in position. The at least one non-contact physiological parameter monitoring apparatus 300 is respectively arranged at a worktable surface of the triage table 200 which corresponds to at least one position 201. In other embodiments, the non-contact physiological parameter monitoring apparatus 300 can also be arranged at other places, as long as it can enable the patient to be within the acquisition range of the physiological parameter. For example, the non-contact physiological parameter monitoring apparatus 300 can be arranged at the ceiling, wall, and other positions.

Figure 8:
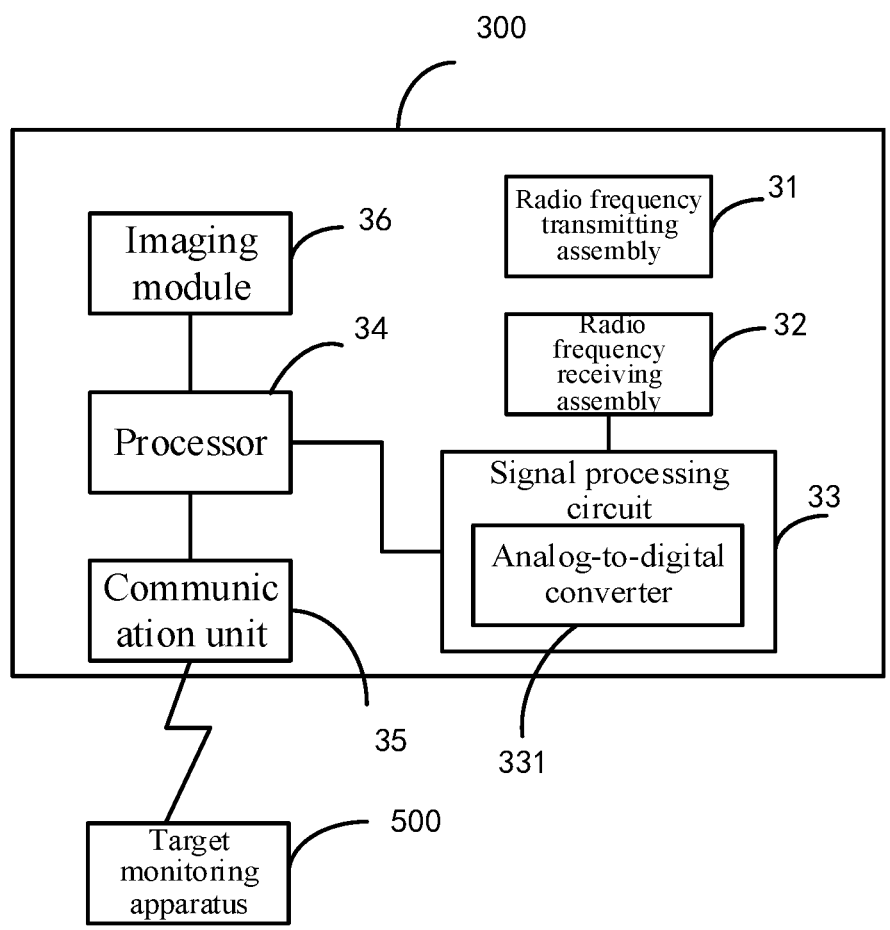
FIG. 8 is a structural block diagram of a non-contact physiological parameter monitoring apparatus, according to another embodiment of this disclosure.

Please also refer to FIG. 8, which is a structural block diagram of a non-contact physiological parameter monitoring apparatus 300. Each non-contact physiological parameter monitoring apparatus 300 includes a radio frequency transmitting assembly 31, a radio frequency receiving assembly 32, a signal processing circuit 33 and a processor 34. The radio frequency transmitting assembly 31 is configured to generate an electromagnetic wave of a designated frequency and transmit the electromagnetic wave of the designated frequency towards a corresponding triage position. The radio frequency receiving assembly 32 is configured to receive a reflected wave beam which is reflected back from a designated part of a patient at the triage position 201. The signal processing circuit 33 is configured to convert the reflected wave beam into a physiological parameter signal. The processor 34 is configured to analyze the physiological parameter signal to obtain a physiological parameter value, and to control to output the physiological parameter value.

In this disclosure, a non-contact physiological parameter monitoring apparatus 300 is arranged at a triage position 201 of a triage table 200. The non-contact physiological parameter monitoring apparatus 300 generates an electromagnetic wave of a designated frequency and transmits the same to a corresponding triage position, receives the reflected wave beam which is reflected from a designated body part of the patient at the triage position 201, and then converts the reflected wave beam into a physiological parameter signal, analyzes the physiological parameter signal to obtain a physiological parameter value, and controls to output the physiological parameter value. In such a way, the physiological parameter value of the patient at the triage position 201 can be automatically obtained by a non-contact way, and multiple patients can be measured at multiple triage positions 201 at the same time without requiring the medical staff to perform the contact operations, which improves the triage efficiency.

In some embodiments, the number of at least one non-contact physiological parameter monitoring apparatus 300 can be equal to the number of at least one triage position 201 of the triage table 200, and one non-contact physiological parameter monitoring apparatus 300 is arranged at a position of the worktable surface of the triage table 200 which corresponds to one triage position 201. Obviously, in other embodiments, the number of at least one non-contact physiological parameter monitoring apparatus 300 can also be less than the number of at least one triage position 201 of the triage table 200.

Wherein, the triage position 201 is the corresponding position in front of the triage table 200 when patients are triaged, and a stool can be arranged in front of the triage table 200 corresponding to triage position 201 for the patient to sit down for examination before triage. Obviously, the position in front of the triage table 200 corresponding to the triage position 201 may not be arranged with a stool, and the patient can stand for the examination before triage.

As shown in FIG. 7, the triage table monitoring system 100 further includes at least one display 400, the non-contact physiological parameter monitoring apparatus 300 is connected with the corresponding display 400, and the processor 34 is configured to control to output and display the physiological parameter value on the corresponding display 400. Wherein, the processor 34 controls to output and display the physiological parameter value on the corresponding display 400 can include follows. The processor 34 transmits the physiological parameter value to the display 400, displays and outputs the same through the display 400.

Wherein, the at least one display 400 is arranged at the worktable surface of the triage table 200, and can be used by medical staff to directly watch the physiological parameter value of each patient.

In some embodiments, the triage table monitoring system 100 further includes a plurality of displays 400, each of which is connected with a corresponding non-contact physiological parameter monitoring apparatus 300, and receives the physiological parameter value which is generated by the corresponding non-contact physiological parameter monitoring apparatus 300, and displays and outputs the same. Wherein, each display 400 is arranged on the worktable surface of the triage table 200 which corresponding to each triage position 201, for medical staff to view the physiological parameter value. Obviously, the medical staff only need to watch whether the physiological parameter value which is outputted by the display 400 is normal, and do not need to perform contact measurement operations. Only a few medical staff, such as one medical worker, are needed to complete the examination before triage.

In another embodiment, the triage table monitoring system 100 can only include a display 400 which is arranged at the worktable surface of the triage table 200. All non-contact physiological parameter monitoring apparatuses 300 are connected to the display 400, and the display 400 displays and outputs the physiological parameter values which are generated by all non-contact physiological parameter monitoring apparatuses 300.

Specifically, the physiological parameter values which are transmitted by the processor 34 to the display 400 can be display data which corresponds to the physiological parameter values, and the display 400 can receive the physiological parameter values which are generated by the corresponding non-contact physiological parameter monitoring apparatus 300, or the display data corresponding to the physiological parameter values which are generated by the non-contact physiological parameter monitoring apparatus 300.

The display 400 can be an independent display screen, or an electronic device with a display screen, such as a tablet computer, laptop computer, etc.

As shown in FIG. 8, each non-contact physiological parameter monitoring apparatus 300 further includes a communication unit 35. The processor 34 establishes a communication connection between the non-contact physiological parameter monitoring apparatus 300 and a target monitoring apparatus 500 through the communication unit 35, and is configured to transmit the physiological parameter value to the target monitoring apparatus 500, and output and display the physiological parameter value through the target monitoring apparatus 500.

Among them, target monitoring apparatus 500 includes at least one of department-level workstation apparatus, hospital-level data center and hospital-level emergency management center apparatus.

The communication unit 35 includes a wired communication unit and/or a wireless communication unit, and the communication connection between the non-contact physiological parameter monitoring apparatus 300 and the target monitoring apparatus 500 includes a wired communication connection and/or a wireless communication connection.

As shown in FIG. 8, the signal processing circuit 33 includes an analog-to-digital converter 331, which is coupled with the radio frequency receiving assembly 32 to acquire the reflected wave beam which is received by the radio frequency receiving assembly 32 and convert the reflected wave beam which is received by the radio frequency receiving assembly 32 into the corresponding physiological parameter signal.

Figure 9:
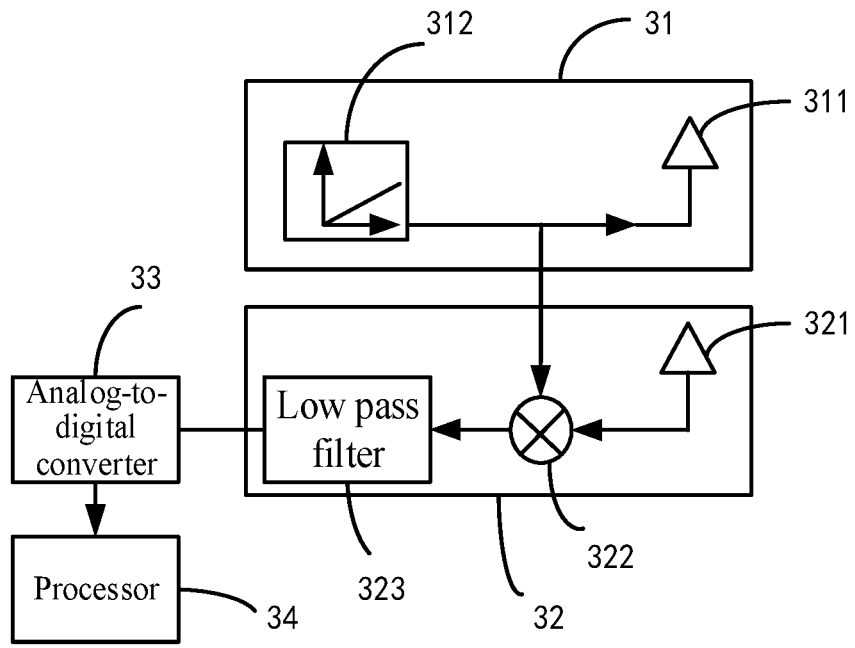
FIG. 9 is a specific structure diagram of a radio frequency transmitting assembly and radio frequency receiving assembly, according to another embodiment of this disclosure.

Refer to FIG. 9, which is a specific structure diagram of a radio frequency transmitting assembly 31 and radio frequency receiving assembly 32. As shown in FIG. 9, the radio frequency transmitting assembly 31 includes a transmitting antenna 311, the radio frequency receiving assembly 32 includes a receiving antenna 321. The transmitting antenna 311 is configured to transmit an electromagnetic wave of a designated frequency towards a corresponding triage position, and the receiving antenna 321 is configured to receive the reflected wave beam.

The transmitting antenna 311 and the receiving antenna 321 constitute a single-transmitting and single-receiving antenna or a multiple-transmitting and multiple-receiving antenna. That is, the transmitting antenna 311 and the receiving antenna 321 can cooperate with each other to constitute a transceiver antenna of single-transmitting and single-receiving or a transceiver antenna of multiple-transmitting and multiple-receiving.

The radio frequency transmitting assembly 31 further includes a synthesizer 312, which is coupled with the transmitting antenna 311 to generate an electromagnetic wave of a designated frequency and transmit the same through the transmitting antenna 311. The receiving antenna 321 is configured to receive the reflected wave beam. The radio frequency receiving assembly 32 further includes a frequency mixer 322, which is coupled between the receiving antenna 321 and the signal processing circuit 33 and is configured to implement a frequency mixing processing on the reflected wave beam which is received by the receiving antenna 321 and transmit the same to the signal processing circuit 33. The signal processing circuit 33 is specifically configured to convert the reflected wave beam after frequency mixing processing into a physiological parameter signal. Specifically, the frequency mixer 322 transmits the reflected wave beam received by the receiving antenna 321 to the analog-to-digital converter 331 in the signal processing circuit 33 after the frequency mixing processing, and then the analog-to-digital converter 331 converts the reflected wave beam after the frequency mixing processing into a physiological parameter signal.

Among them, there can be at least one transmitting antenna 311 and at least one receiving antenna 321. The number of the transmitting antenna 311 and the receiving antenna 321 is the same or different. Wherein, when there are one transmitting antenna 311 and one receiving antenna 321, the transmitting antenna 311 and the receiving antenna 321 can constitute a single-transmitting and single-receiving antenna, while when there are multiple transmitting antennas 311 and receiving antennas 321, the transmitting antenna 311 and the receiving antenna 321 can constitute a multiple-transmitting and multiple-receiving antenna.

Wherein, the radio frequency receiving assembly 32 further includes a low pass filter 323, which is coupled between the frequency mixer 322 and the first signal processing circuit 13 to filter the reflected wave beam after the frequency mixing processing. The first signal processing circuit 33 is specifically configured to convert the reflected wave beam after the frequency mixing processing and filtering into the physiological parameter signal.

That is, in some embodiments, the radio frequency receiving assembly 32 simultaneously includes a frequency mixer 322 and a low pass filter 323. The frequency mixer 322 and the low pass filter 323 are sequentially coupled between the receiving antenna 321 and the corresponding signal processing circuit 33. The frequency mixer 322 is configured to implement a frequency mixing processing on the reflected wave beam received by the receiving antenna 321 and transmit it to the low pass filter 323. The low pass filter 323 is coupled between the frequency mixer 322 and the corresponding signal processing circuit 33 to filter the reflected wave beam after the frequency mixing processing. The signal processing circuit 33 is specifically configured to convert the reflected wave beam after the frequency mixing processing and filtering into a physiological parameter signal.

Figure 10:
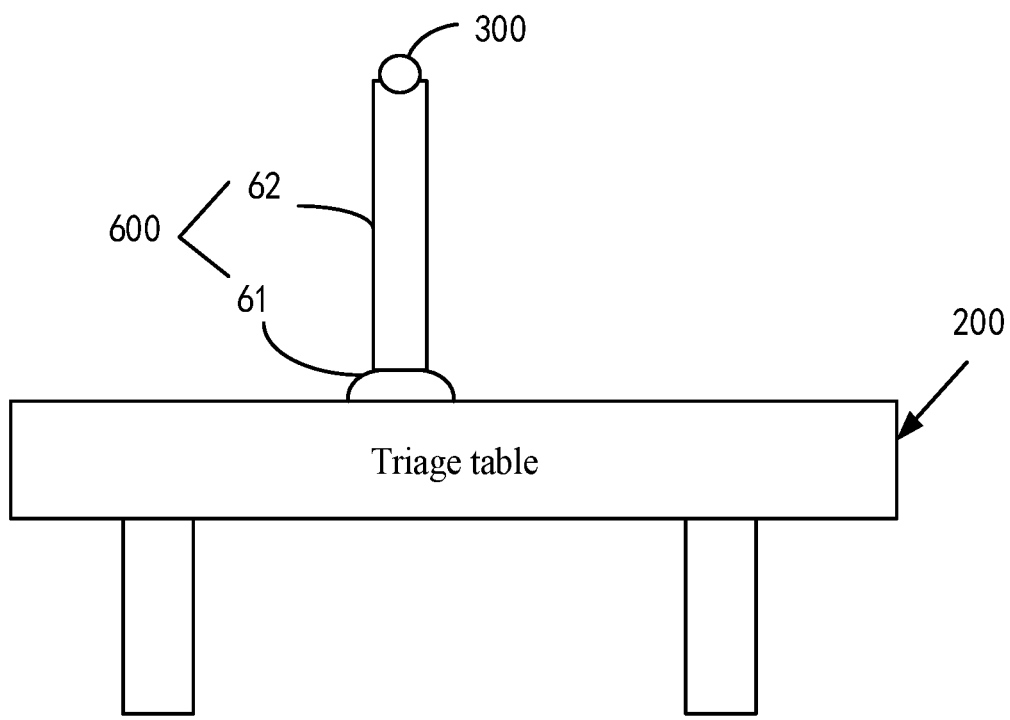
FIG. 10 is a schematic diagram of a support seat, according to one embodiment of this disclosure.

Refer to FIG. 10, which is a schematic diagram of a support seat. The triage table monitoring system 100 further includes at least one support seat 600, each support seat 600 includes a seat 61 and a movable bearing member 62 which is arranged at the seat 61 that can move relative to the seat 61, and the at least one non-contact physiological parameter monitoring apparatus 300 is respectively fixed at the movable bearing member 62 of the at least one support seat 600.

Wherein, the support seat 600 is supported at a bearing surface. Specifically, the support seat 600 can be fixed at the worktable surface of the triage table 200 through the seat 31. The number of the support seat 600 is same as or different from the number of the non-contact physiological parameter monitoring apparatus 300. Each non-contact physiological parameter monitoring apparatus 300 can be arranged at the triage table 200 through a corresponding support seat 600.

In some embodiments, the seat 31 can be fixed at the worktable surface of the triage table 200 by means of screw locking, bonding, etc. In another embodiment, the seat 31 can be a sucker-like structure made of soft plastic and other materials. It can be adsorbed at the table surface of the triage table 200 by extruding air, so that when the support seat 600 needs to be moved, it can be moved conveniently.

Wherein, the movable bearing member 32 of each support seat 600 can be retractable upwardly and downwardly and/or rotate in arbitrary direction(s) relative to the corresponding seat 31, thus driving the corresponding non-contact physiological parameter monitoring apparatus 300 to move up and down or rotate, and adjusting the transmitting direction of the radio frequency transmitting assembly 31 and the receiving direction of the radio frequency receiving assembly 32 at the non-contact physiological parameter monitoring apparatus 300.

That is, the non-contact physiological parameter monitoring apparatus 30 is fixed at the movable bearing member 62 of the support seat 600, and the movable bearing member 62 can be retractable upwardly and downwardly and/or rotate in arbitrary direction(s), so that the non-contact physiological parameter monitoring apparatus 300 can move up and down or rotate correspondingly, and the transmitting direction of the radio frequency transmitting assembly 31 and the receiving direction of the radio frequency receiving assembly 32 can be adjusted. Thus, it is convenient to align the designated part (such as the chest position) of the patient at the triage position 201 of the triage table 200. Wherein, the reflected wave beam which is from the designated body part of the patient and received by the radio frequency receiving assembly 32 at the triage position 201, reflects a fluctuation law of the chest of the patient, and the fluctuation law of the chest of the patient further reflects the heartbeat information and/or respiratory information of the patient, that is, the heart rate and/or respiration rate. The signal processing circuit 33 is configured to convert the reflected wave beam into the first-type physiological parameter signal, and the processor 34 is configured to analyze the first-type physiological parameter signal to obtain the heart rate and/or respiration rate.

Figure 11:
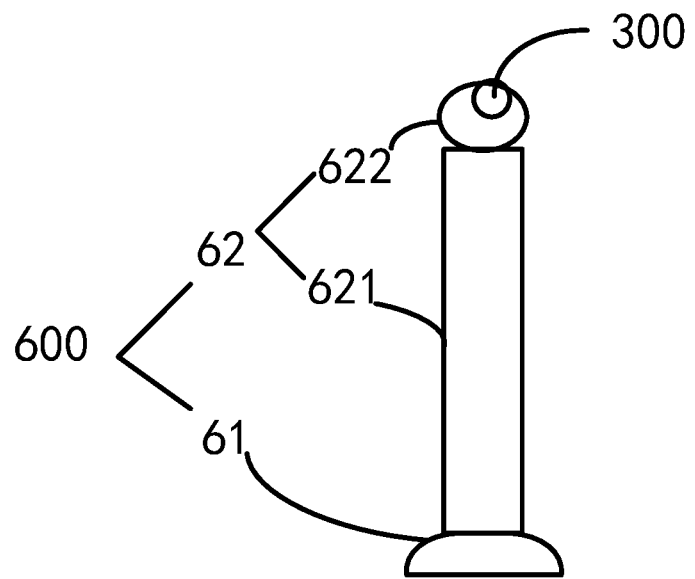
FIG. 11 is a further detailed structural diagram of a support seat, according to one embodiment of this disclosure.

Refer to FIG. 11, which is a further detailed structural diagram of a support seat. In some embodiments, the movable bearing member 62 includes a telescopic rod 621 that can extend toward or retract back from the seat 61, and a cardan shaft 622 which is arranged at an end of the telescopic rod 621 which is away from the seat 61. The non-contact physiological parameter monitoring apparatus 300 is fixedly arranged at the cardan shaft 622. The cardan shaft 622 can be movably connected with the end of the telescopic rod 621 which is away from the seat 61, and can rotate in an arbitrary direction(s) relative to the telescopic rod 621.

That is, in some embodiments, the movable bearing member 62 specifically includes a telescopic rod 621 and a cardan shaft 622. The non-contact physiological parameter monitoring apparatus 30 is fixed at the cardan shaft 622, while the cardan shaft 622 can rotate in arbitrary direction(s) to adjust the transmitting direction of the radio frequency transmitter assembly 31 and the receiving direction of the radio frequency receiver assembly 32, and further to adjust the height of the telescopic rod 621 at the triage table 200.

Thus, when different patients sit on the stool of triage position 201 of triage table 200, the height of non-contact physiological parameter monitoring apparatus 30 on triage table 200 can be adjusted through the telescopic rod 621, and the transmitting direction of radio frequency transmitting assembly 31 and the receiving direction of radio frequency receiving assembly 32 can be adjusted through the rotation of cardan shaft 622 according to the height and sitting position of the patient, such that the transmitting direction of the radio frequency transmitting assembly 31 of the non-contact physiological parameter monitoring apparatus 30 is directed toward a designated body part of the patient.

Please refer back to FIG. 8. Each non-contact physiological parameter monitoring apparatus 300 further includes an imaging module 36. The orientation of the imaging module 36 is the same as the transmitting direction of the radio frequency transmitting assembly 31. The imaging module 36 is configured to acquire the image of the patient at the current triage position. The processor 34 is further configured to compare the image of the patient at the current triage position acquired by the imaging module 36 with a preset image, analyze whether the transmitting direction of the radio frequency transmitting assembly faces the designated body part of the patient. The processor 34 is further configured to control the movable bearing member 62 to move according to the difference between the image of the patient at the current triage position acquired by the imaging module 36 and the preset image to enable the transmitting direction of the radio frequency transmitting assembly faces the designated body part of the patient, when determining that the transmitting direction of the radio frequency transmitting assembly 31 fails to face the designated body part of the patient.

Obviously, when the processor 34 determines that the transmitting direction of the radio frequency transmitting assembly directly faces the designated body part of the patient, it can control the radio frequency transmitting assembly 31 to transmit an electromagnetic wave of a designated frequency.

Wherein, the imaging module 36 is a visible light imaging module. In other embodiments, the imaging module 36 can be an infrared light imaging module and can be located inside the non-contact physiological parameter monitoring apparatus 300.

The imaging module 36 can include an optical lens and an image sensor. The optical lens is configured to receive light and transmit the same to the image sensor. The image sensor is connected with the processor 34 to convert received optical signal into an electrical signal and transmit the same to the processor 34 for imaging processing.

Figure 12:
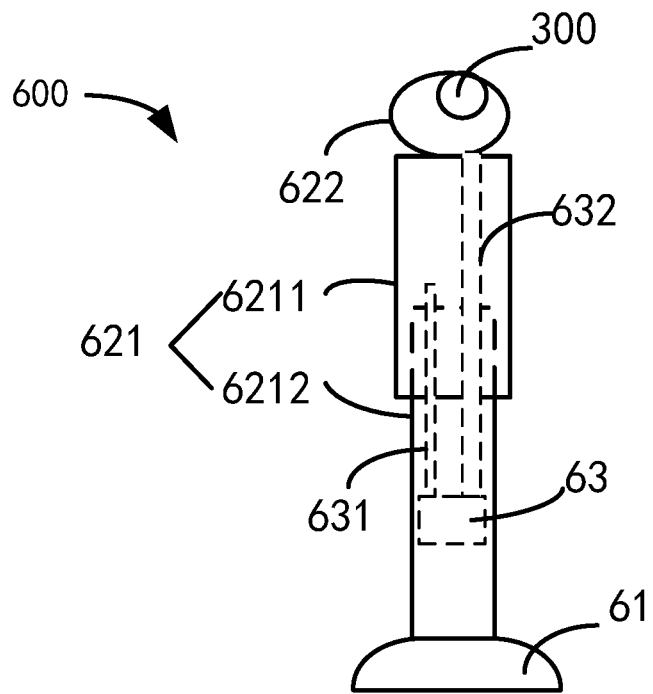
FIG. 12 is a schematic diagram of internal structure of a support seat, according to one embodiment of this disclosure.

Please refer to FIG. 12, which is a schematic diagram of internal structure of the support seat 600 in one embodiment. As shown in FIG. 6, the support seat 600 further includes a drive motor 63, which is configured to drive the telescopic rod 621 to move up and down and drive the cardan shaft 622 to rotate. The processor 34 of the non-contact physiological parameter monitoring apparatus 30 can be electrically connected with the drive motor 63 inside the support seat 600 to control the drive motor 63 to drive the telescopic rod 621 to move up and down and/or drive the cardan shaft 622 to rotate, so that the transmitting direction of the radio frequency transmitting assembly 31 faces the designated body part of the patient.

As shown in FIG. 12, in some embodiments, the telescopic rod 621 can be a sleeve structure, which includes a first sleeve 6211 and a second sleeve 6212 which are slidable relative to each other. The first sleeve 6211 and the second sleeve 6212 have the same shape but different dimensions. In some embodiments, the second sleeve 6212 is fixedly connected with the seat 61, an inner diameter of the first sleeve 6211 is greater than an outer diameter of the second sleeve 6212, and the first sleeve 6211 is sleeved outside the second sleeve 6212. In addition, a slide structure (not shown) is arranged between an inner wall of the first sleeve 6211 and an outer wall of the second sleeve 6212. The first sleeve 6211 and the second sleeve 6212 can move along a telescopic direction of the telescopic rod 621 through the slide structure. For example, the slide structure can include a slide rail and a protrusion. The slide rail is arranged at the inner wall of the first sleeve and extends along the telescopic direction of the telescopic rod 621. The protrusion is arranged at the outer wall of the second sleeve 6121 and accommodated inside the slide rail and can slide along the slide rail. Thus, the first sleeve 6211 and the second sleeve 6212 can move along the telescopic direction of the telescopic rod 621 through the slide structure.

The drive motor 63 can be fixedly arranged at the inner wall of the second sleeve 6212, and the drive motor 63 is connected with the inner wall of the first sleeve 6121 through a first drive conduction member 631. The drive motor 63 can drive the first sleeve 6121 to move towards or away from the seat 61 through the first drive conduction member 631, thus realizing the telescopic movement of the telescopic rod 621. One end of the first drive conduction member 631 can be engaged with the drive motor 63 through gears, and the other end of the first drive conduction member 631 can be fixed at the inner wall of the first sleeve 6121. The drive motor 63 enables the first drive conduction member 631 to move towards or away from the seat 61 by changing the rotation direction of the motor, thus driving the first sleeve 6121 to move towards or away from the seat 61.

The drive motor 63 can also be connected with the cardan shaft 622 through the second drive conduction member 632, and the second drive conduction member 632 can drive the cardan shaft 622 to rotate. Wherein, the second drive conduction member 632 can be a multidirectional transmitting assembly.

The first sleeve 6121 and the second sleeve 6212 can be rounded sleeves, square sleeves, etc.

Wherein, the processor 34 can be electrically connected with the drive motor 63 through a flexible circuit board, a conductive wire, etc., which penetrate into and are arranged inside the first sleeve 6121 and the second sleeve 6212.

In some embodiments, the telescopic rod 621 is configured to extend toward or retract back from the seat 61 in response to a manual operation of a user, and the cardan shaft 622 is capable of rotating in arbitrary direction(s) in response to the manual operation of the user. The telescopic rod 621 can be in the form of a multi-section sleeve which is similar to a television antenna, and can be retracted or stretched under the operation of a user.

In other embodiments, the movable bearing member 62 can also be made of materials such as memory metal rod that can be bent to any shape. One end of the movable bearing member 62 is fixed at the seat 61. The non-contact physiological parameter monitoring apparatus 300 can be fixed at the other end of the movable bearing member 62. The movable bearing member 62 can change its height and bend in arbitrary direction(s) in response to the manual operation of the user.

In some embodiments, the physiological parameter value includes at least one of respiration rate and heart rate.

Wherein, the electromagnetic wave of the designated frequency is a millimeter wave.

Wherein, the processor 34 can be a central processing unit (CPU), or other general-purpose processors, digital signal processor (DSP), application specific integrated circuits (ASIC), field-programmable gate arrays (FPGA) or other programmable logic device, discrete gate or transistor logic device, discrete hardware components, etc. A general-purpose processor may be a microprocessor or any conventional processor or the like.

The display 400 is an independent LCD display, LED (light emitting diode) display, electronic paper display, etc.; or is an LCD display, LED display, electronic paper display, etc., which are integrated in tablet computers and laptops.

The communication unit 35 can include at least one of wired interface, WIFI module, Bluetooth module, WMTS communication module and NFC communication module.

Figure 13:
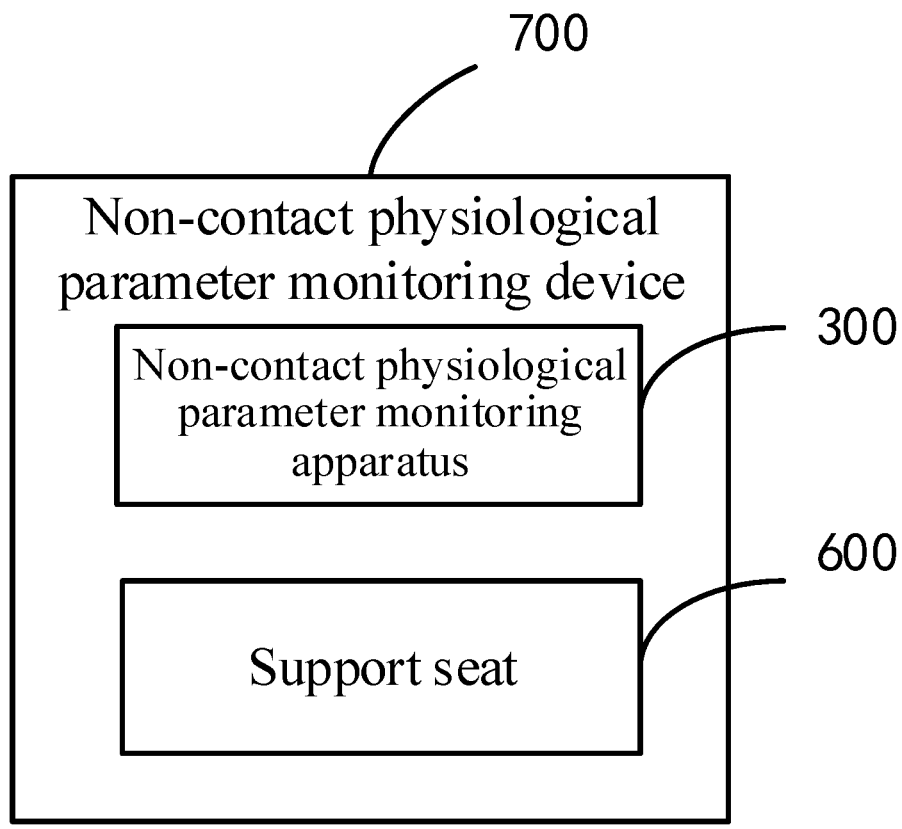
FIG. 13 is a structural block diagram of a non-contact physiological parameter monitoring apparatus, according to another embodiment of this disclosure.

Refer to FIG. 13, which is a structural block diagram of a non-contact physiological parameter monitoring device 700 according to another embodiment of this disclosure. This disclosure also provides a non-contact physiological parameter monitoring device 700, which includes the aforementioned non-contact physiological parameter monitoring apparatus 300 and a support seat 600. That is, in some embodiments, the non-contact physiological parameter monitoring apparatus 300 and the support seat 600 can be integrated to constitute a non-contact physiological parameter monitoring device 700.

The specific structures and functions of the non-contact physiological parameter monitoring apparatus 300 and the support seat 600 are described above, and are not repeated here.

Wherein, the structure and function of each non-contact physiological parameter monitoring apparatus 300 in this disclosure can be the same, referring the above description for details. The structure and function of each support seat 600 are the same, referring the previous description for details.

In the embodiment shown in FIG. 7, one non-contact physiological parameter monitoring apparatus corresponds to one triage position. In other embodiments, one non-contact physiological parameter monitoring apparatus may correspond to multiple triage positions. The triage platform monitoring system includes:

a triage table with at least one triage position, wherein the triage position is configured to implement a preliminary examination before triage for a patient in position; and a non-contact physiological parameter monitoring apparatus, which includes:

at least a group of radio frequency signal receiving and transmitting assemblies, each group of radio frequency signal receiving and transmitting assemblies are correspondingly associated with one triage position of the triage table and are configured to transmit an electromagnetic wave of a designated frequency to the patient at the triage position and to receive a reflected wave beam which is reflected back from a designated body part of the patient at the triage position;

a signal processing circuit, which is configured to convert the reflected wave beam which is received by each group of radio frequency signal receiving and transmitting assemblies into a corresponding physiological parameter signal; and a processor, which is configured to analyze each physiological parameter signal to obtain a group of physiological parameter values, to determine patient identity information which corresponds to each group of physiological parameter values according to a preset association relationship between the radio frequency signal receiving and transmitting assemblies and the triage position of the triage table, and to bind and output each group of physiological parameter values and corresponding patient identity information thereof.

Of course, in the two schemes of one non-contact physiological parameter monitoring apparatus corresponds to one triage position and one non-contact physiological parameter monitoring apparatus corresponds to multiple triage positions, the structures of the non-contact physiological parameter monitoring apparatus are similar, and their structures can refer to the above description which are not repeated here.

This disclosure arranges a non-contact physiological parameter monitoring apparatus 300 at the triage position 201 of the triage table 200. The non-contact physiological parameter monitoring apparatus 300 generates an electromagnetic wave of a designated frequency and transmits the same to a corresponding triage position, receives the reflected wave beam which is reflected from a designated body part of the patient at the triage position 201, and then converts the reflected wave beam into a physiological parameter signal, analyzes the physiological parameter signal to obtain a physiological parameter value, and controls to output the physiological parameter value. In such a way, the physiological parameter value of the patient at the triage position can be automatically obtained by a non-contact way, and multiple patients can be measured at multiple triage positions at the same time without requiring the medical staff to perform the contact operations, which improves the triage efficiency. Moreover, through the support seat 600, the transmitting direction of the radio frequency transmitting assembly 31 of the non-contact physiological parameter monitoring apparatus 300 can be adjusted to directly face the designated body part of the patient, regardless of the sitting posture and height of the patient, thereby improving the accuracy and convenience of measurement.

Wherein, the monitoring device 1 described earlier in this disclosure can correspond to the non-contact physiological parameter monitoring apparatus 300, or the non-contact physiological parameter monitoring device 700 including the non-contact physiological parameter monitoring apparatus 300 and the support seat 600.

In the above embodiments, the description of each embodiment has its own emphasis. For the part not described in detail in one embodiment, please refer to the relevant description of other embodiments.

The embodiments of this disclosure are described in detail above. In this disclosure, specific embodiments are used to illustrate the principles and embodiments of this disclosure. The description of the above embodiments is only used to help understand the methods and core ideas of this disclosure. At the same time, for those skilled in the art, modifications may be made to the specific embodiments and application scope of this disclosure, without departing from the spirit or scope of this disclosure. In conclusion, the content of the specification should not be interpreted as a limitation to this disclosure.

What is claimed is:

1. A monitoring device having a non-contact physiological parameter monitoring function, comprising:

a radio frequency transmitting assembly, which is configured to generate an electromagnetic wave of a designated frequency and transmit the electromagnetic wave of the designated frequency towards a designated part of a human body;

a radio frequency receiving assembly, which is configured to receive a reflected wave beam which is reflected back from the designated part of the human body;

a first signal processing circuit, which is configured to convert the reflected wave beam into a first-type physiological parameter signal; and a processor, which is configured to analyze the first-type physiological parameter signal to obtain a first-type physiological parameter value and to control to output the first-type physiological parameter value, wherein the monitoring device further comprises at least one parameter measurement sensor and a second signal processing circuit; wherein the at least one parameter measurement sensor comprises a measurement terminal and a connection terminal, the at least one parameter measurement sensor is configured to acquire a measurement signal by contacting the human body with the measurement terminal, the second signal processing circuit is connected with the connection terminal of the at least one parameter measurement sensor and is configured to convert the measurement signal into a second-type physiological parameter signal; the processor is further configured to analyze the second-type physiological parameter signal to obtain a second-type physiological parameter value, and control to output the second-type physiological parameter value;

wherein the processor comprises a first-type physiological parameter signal processor, a second-type physiological parameter signal processor, and a main controller;

wherein the monitoring device further comprises a circuit board, which is provided with an isolation zone, wherein the isolation zone separates the circuit board into an isolated area and a non-isolated area; wherein the second-type physiological parameter signal processor, the at least one parameter measurement sensor and the second signal processing circuit are arranged inside the isolated area, while the first-type physiological parameter signal processor, the main controller, the radio frequency transmitting assembly, the radio frequency receiving assembly and the first signal processing circuit are arranged inside the non-isolated area; and wherein the monitoring device further comprises: an isolated power supply circuit arranged inside the isolation zone, the non-isolated power supply circuit being configured to reduce a main voltage to provide electric power to the first-type physiological parameter signal processor, the main controller, the radio frequency transmitting assembly, the radio frequency receiving assembly and the first signal processing circuit; and a non-isolated power supply circuit arranged inside the non-isolated area, the isolated power supply circuit being configured to reduce the main voltage to provide electric power to the second-type physiological parameter signal processor, the at least one parameter measurement sensor and the second signal processing circuit.

2. The monitoring device according to claim 1, wherein the monitoring device further comprises a display screen, and the processor is further configured to control the display screen to output and display the first-type physiological parameter value and the second-type physiological parameter value.

3. The monitoring device according to claim 2, wherein the first-type physiological parameter value comprises at least one of respiration rate and heart rate, and the second-type physiological parameter value comprises at least one of body temperature, blood oxygen and blood pressure.

4. The monitoring device according to claim 1, wherein the monitoring device further comprises a communication unit, wherein the processor is further configured to establish a communication connection between the monitoring device and a target monitoring apparatus through the communication unit, transmit the first-type physiological parameter value and the second-type physiological parameter value to the target monitoring apparatus through the communication unit, and output and display the first-type physiological parameter value and the second-type physiological parameter value through the target monitoring apparatus.

5. The monitoring device according to claim 1, wherein the radio frequency transmitting assembly comprises a transmitting antenna, the radio frequency receiving assembly comprises a receiving antenna; wherein the transmitting antenna and the receiving antenna are arranged at a housing of the monitoring device, the transmitting antenna is configured to transmit the electromagnetic wave of the designated frequency towards an outside of the housing of the monitoring device, and the receiving antenna is configured to receive the reflected wave beam.

6. The monitoring device according to claim 5, wherein the monitoring device is a desktop monitoring device, the transmitting antenna and the receiving antenna are arranged at a non-display area of a front panel of the desktop monitoring device.

7. The monitoring device according to claim 5, wherein the monitoring device is a desktop monitoring device, wherein the monitoring device further comprises a movable antenna support frame which is arranged at a top of the monitoring device, the transmitting antenna and the receiving antenna are fixed at and supported by the antenna support frame, wherein the antenna support frame is configured to adjust a transmitting angle of the transmitting antenna and a receiving angle of the receiving antenna.

8. The monitoring device according to claim 7, wherein the antenna support frame is capable of rotating 360 degrees relative to the monitoring device to control the transmitting antenna and the receiving antenna to face arbitrary direction (s), so as to adjust the transmitting angle of the transmitting antenna and the receiving angle of the receiving antenna.

9. The monitoring device according to claim 5, wherein the monitoring device is a handheld monitoring device, wherein the handheld monitoring device comprises a handheld end and a signal receiving and transmitting end which is away from the handheld end; wherein the transmitting antenna and the receiving antenna are arranged at the signal receiving and transmitting end of the handheld monitoring device.

10. The monitoring device according to claim 5, wherein in response to both the transmitting antenna and the receiving antenna are provided in one unit, the transmitting antenna and the receiving antenna form a single-input single-output antenna configuration; or in response to the transmitting antenna and receiving antenna are provided in a plurality of units, the transmitting antenna and the receiving antenna form a multiple-input multiple-output (MIMO) antenna configuration.

11. The monitoring device according to claim 5, wherein the radio frequency transmitting assembly further comprises a synthesizer, which is coupled with the transmitting antenna to generate the electromagnetic wave of the designated frequency and transmit the electromagnetic wave of the designated frequency through the transmitting antenna;

the receiving antenna is configured to receive the reflected wave beam, wherein the radio frequency receiving assembly further comprises a frequency mixer, which is coupled between the receiving antenna and the first signal processing circuit and is configured to implement a frequency mixing processing on the reflected wave beam which is received by the receiving antenna and transmit the reflected wave beam after the frequency mixing processing on the first signal processing circuit; wherein first signal processing circuit is further configured to convert the reflected wave beam after the frequency mixing processing into the first-type physiological parameter signal.

12. The monitoring device according to claim 11, wherein the radio frequency receiving assembly further comprises a low pass filter, which is coupled between the frequency mixer and the first signal processing circuit to filter the reflected wave beam after the frequency mixing processing, wherein the first signal processing circuit is further configured to convert the reflected wave beam after the frequency mixing processing and the filtering into the first-type physiological parameter signal.

13. The monitoring device according to claim 1, wherein the first-type physiological parameter signal processor is configured to analyze the first-type physiological parameter signal to obtain the first-type physiological parameter value and transmit the first-type physiological parameter value to the main controller; the second-type physiological parameter signal processor is configured to analyze the second-type physiological parameter signal to obtain the second-type physiological parameter value and transmit the second-type physiological parameter value to the main controller; the main controller is configured to control to output and display the first-type physiological parameter value and the second-type physiological parameter value.

14. The monitoring device according to claim 1, wherein an isolation communication interface is arranged inside the isolation zone, the second-type physiological parameter signal processor is configured to establish a communication connection with the main controller through the isolation communication interface for transmitting the second-type physiological parameter value to the main controller.

15. The monitoring device according to claim 5, wherein the monitoring device is a sphygmomanometer, wherein the transmitting antenna and the receiving antenna are arranged at a non-display area of a scale panel of the sphygmomanometer.

16. The monitoring device according to claim 1, wherein the electromagnetic wave of the designated frequency is a millimeter wave.

17. A non-contact physiological parameter monitoring device comprising a support seat and a non-contact physiological parameter monitoring apparatus; wherein the non-contact physiological parameter monitoring apparatus is fixed at the support seat; wherein the non-contact physiological parameter monitoring apparatus comprises a radio frequency transmitting assembly, a radio frequency receiving assembly, a signal processing circuit and a processor;
  wherein the radio frequency transmitting assembly is configured to generate an electromagnetic wave of a designated frequency and transmit the electromagnetic wave of the designated frequency towards a corresponding triage position; the radio frequency receiving assembly is configured to receive a reflected wave beam which is reflected back from a designated part of a patient at the triage position; the signal processing circuit is configured to convert the reflected wave beam into a physiological parameter signal; the processor is configured to analyze the physiological parameter signal to obtain a physiological parameter value and to control the physiological parameter value to output;
  wherein the support seat comprises a seat and a movable bearing member which is arranged at the seat and is movable relative to the seat, the non-contact physiological parameter monitoring apparatus is arranged at the movable bearing member of the support seat;
  wherein the monitoring device further comprises at least one parameter measurement sensor and a second signal processing circuit; wherein the at least one parameter measurement sensor comprises a measurement terminal and a connection terminal, the at least one parameter measurement sensor is configured to acquire a measurement signal by contacting the human body with the measurement terminal, the second signal processing circuit is connected with the connection terminal of the at least one parameter measurement sensor and is configured to convert the measurement signal into a second-type physiological parameter signal; the processor is further configured to analyze the second-type physiological parameter signal to obtain a second-type physiological parameter value, and control to output the second-type physiological parameter value;
  wherein the processor comprises a first-type physiological parameter signal processor, a second-type physiological parameter signal processor, and a main controller;
  wherein the monitoring device further comprises a circuit board, which is provided with an isolation zone, wherein the isolation zone separates the circuit board into an isolated area and a non-isolated area; wherein the second-type physiological parameter signal processor, the at least one parameter measurement sensor and the second signal processing circuit are arranged inside the isolated area, while the first-type physiological parameter signal processor, the main controller, the radio frequency transmitting assembly, the radio frequency receiving assembly and the first signal processing circuit are arranged inside the non-isolated area; and
  wherein the monitoring device further comprises: an isolated power supply circuit arranged inside the isolation zone, the non-isolated power supply circuit being configured to reduce a main voltage to provide electric power to the first-type physiological parameter signal processor, the main controller, the radio frequency transmitting assembly, the radio frequency receiving assembly and the first signal processing circuit; and a non-isolated power supply circuit arranged inside the non-isolated area, the isolated power supply circuit being configured to reduce the main voltage to provide electric power to the second-type physiological parameter signal processor, the at least one parameter measurement sensor and the second signal processing circuit.

18. The monitoring device according to claim 1, wherein the analyzing of the first-type physiological parameter signal to obtain a first-type physiological parameter value and to control to output the first-type physiological parameter value comprises: analyzing the first-type physiological parameter signal to obtain the first-type physiological parameter value; obtaining corrected first-type physiological parameter value through correcting the first-type physiological parameter value based on a correction value which is obtained in advance; and controlling to output the corrected first-type physiological parameter value.

19. The monitoring device according to claim 1, further comprising: a power supply circuit arranged inside the non-isolated area and comprising a main power interface configured to receive the main voltage, wherein both the isolated power supply circuit and the non-isolated power supply circuit are connected with the power supply circuit.

20. The monitoring device according to claim 19, wherein the isolated power supply circuit comprises a first AC/DC converter to convert the main voltage into a DC voltage and reduce the DC voltage, so as to generate a power supply voltage which is suitable for the second-type physiological parameter signal processor, the at least one parameter measurement sensor and the second signal processing circuit; and the non-isolated power supply circuit comprises a second AC/DC converter connected with the main power interface to convert the main voltage into a DC voltage and reduce the DC voltage, so as to generate a power supply voltage which is suitable for the first-type physiological parameter signal processor, the main controller, the radio frequency transmitting assembly, the radio frequency receiving assembly and the first signal processing circuit.

* * * * *